UNITED STATES PATENT OFFICE.

IVAN LEVINSTEIN, OF MANCHESTER, ENGLAND, ASSIGNOR TO COMPANY OF LEVINSTEIN LIMITED, OF MANCHESTER, ENGLAND.

SULFONATED PALMITIC COMPOUND.

1,219,967. Specification of Letters Patent. Patented Mar. 20, 1917.

No Drawing. Application filed February 12, 1913. Serial No. 748,037.

*To all whom it may concern:*

Be it known that I, IVAN LEVINSTEIN, M. Sc. Tech., a subject of the King of Great Britain and Ireland, and a resident of Manchester, in the county of Lancaster, England, have invented new and useful Sulfonated Palmitic Compounds, of which the following is a specification.

This invention relates to soluble, miscible or emulsifiable compounds composed of sulfo acids and their salts produced from fats, greases, or waxes which are solid or semi-solid at ordinary temperatures and which contain either palmitic acid or palmitin or both. These compounds are useful in making waxes, fats, greases, and oils or solvents such as turpentine, carbon tetrachlorid or aromatic hydrocarbons soluble or miscible or emulsifiable in water. Such a solid or semi-solid fat, grease or the like is hereinafter generally referred to as a palmitic fat unless it is otherwise distinguished.

Speaking broadly and without restriction to the indicated classification, the sulfo acids and their salts are generally available for use with mineral waxes and oils, while the neutral or alkaline salts of the sulfo acids are more generally suitable for use with animal or vegetable oils, greases, waxes, fats or the like.

In carrying this invention into effect palmitic fat is melted and is sulfonated in such a manner and under such conditions as to produce a sulfo acid which is soluble or miscible in hot water or alkalinated hot water. This soluble or miscible sulfo acid may itself be combined with the grease, wax, oil, or the like to give the required soluble, miscible, or emulsifiable compound or a soluble miscible salt prepared from the sulfo acid may be similarly employed.

In preparing the described sulfo acids and their salts and in producing the miscible soluble or emulsifiable compounds according to this invention I may proceed as follows:

Example I: 200 parts of Japan wax are melted and gradually run into 200 parts of sulfuric acid monohydrate, the temperature being kept between 40–50° C. The heating is continued until a sample drawn from the bulk and washed dissolves in hot alkaline water. The mixture is then poured into cold water and quickly washed free of mineral acid. The sulfonated wax is melted and allowed to stand to remove any mineral acid and water which may have been retained by the wax.

The sulfonated wax represents the sulfo acid in its free state. It is miscible in hot water and readily forms salts. For example, to obtain the soluble neutral sodium salt the sulfonated wax is melted and caustic soda solution added until a sample dissolved shows a neutral reaction.

Melted with an equal weight of mineral wax either the sulfo acid or its sodium salt will produce a mixture which is miscible in water.

Example II: 200 parts of palm oil are liquefied and 50 parts of concentrated (93 per cent.) sulfuric acid are gradually added. The whole is well stirred and kept at a temperature of 40–50° C. until a sample washed with salt water dissolves in hot water. The bulk is then poured into salt water, quickly washed free of mineral acid, and filtered or decanted.

The sulfo acid so produced is, when free of mineral acid, in the form of a paste which when melted with equal parts of mineral wax gives a compound which dissolves when melted and added to hot water.

This sulfo acid is easily converted into its soluble salts, such as, for example, the sodium salt, the potassium salt, or the ammonium salt. The neutral sodium or the potassium salt may be produced by melting the sulfo acid with either a caustic soda or caustic potash solution until a sample shows a neutral reaction. The ammonium salt may be produced by adding a solution of ammonia to the melted sulfo acid until a sample shows a slightly alkaline reaction.

Any of these salts may be melted with an equal weight of mineral wax to form a compound miscible in water.

Instead of first making the ammonium salt when this salt is to be employed, one part of the free sulfo acid and two parts of the mineral wax may be melted together and ammonia added until a sample shows a slight alkaline reaction. The mixture forms a perfect emulsion in hot water.

In place of the mineral wax miscible, soluble or emulsifiable compounds described in the above example, similar compounds with mineral oils, turpentine, carbon tetrachlorid and other solvents may be produced in a similar manner Example III: The sulfo acid of palm oil produced according to Example 2 is converted into its sodium salt by melting with caustic soda solution until a sample shows a slight alkaline reaction. One part of the sodium salt so produced is then melted with one part of Japan wax and produces therewith a compound miscible in water.

Instead of the Japan wax, beeswax, tallow, and the like may be used to produce with the sodium salt a compound miscible in hot water.

The miscible or soluble compounds thus produced by the above examples from fats, waxes, greases, oils, solvents, and the like by treatment with the described sulfo acids or their salts are very valuable in a variety of trades and industries. For example, the compounds formed with solvents and mineral oils may either be employed as detergents, degreasers, or as softeners in the treatment of textile fibers and materials, and those formed with waxes may be used as water resisting finishes on textile fibers and materials and for other finishing purposes.

The sodium salt of the sulfonated palm oil additionally possesses properties which render it of special value in the preparation of compounds for pharmaceutical and perfumery purposes. It is of the same consistency as a good quality of tallow and possesses a sweet smell resembling violets, which characteristics make it particularly advantageous for use for the indicated purposes.

As an example of the production of a preparation for pharmaceutical purposes the sodium salt of sulfonated palm oil may be melted with an equal weight of lanolin. The resulting compound is soluble in water.

As an example of the production of a perfumery preparation, citronella (an essential oil) treated with an equal weight of the melted sodium salt becomes miscible with water.

Resin oil, pine wood oils, and camphor are examples of other substances, miscible, soluble, or emulsifiable compounds of which can be formed by treatment with the described sulfo acids or with their salts.

Instead of removing the mineral acid contained in the sulfo acid by washing as hereinbefore described such mineral acid may be neutralized by mixing with a suitable alkali. By such treatment a crude alkaline salt of the sulfo acid may be simultaneously produced.

What I claim is:—

1. As a new article of manufacture, a waxy or like product soluble or miscible in water composed of paraffin wax and a sulfo acid of palmitic fat, the sulfo acid having been prepared by melting fat, treating the melted fat with sulfuric acid under heat and quickly washing after the reaction, substantially as set forth.

2. As a new article of manufacture, a waxy or like product soluble or miscible in water composed of paraffin wax and a salt of a sulfo acid of palmitic fat, the sulfo salt having been prepared by melting fat, treating the melted fat with sulfuric acid under heat and the sulfo acid produced with a base, substantially as set forth.

In witness whereof I have hereunto set my hand in the presence of two subscribing witnesses.

IVAN LEVINSTEIN.

Witnesses:
 FRED COLLIN,
 JOHN O'CONNELL.